United States Patent [19]

Link

[11] Patent Number: 4,683,787
[45] Date of Patent: Aug. 4, 1987

[54] METHOD OF MACHINING A WORKPIECE IN A TURRET LATHE AND AN NC LATHE FOR PERFORMING THIS METHOD

[75] Inventor: Helmut F. Link, Aichwald, Fed. Rep. of Germany

[73] Assignee: Index-Werke Komm.-Ges. Han & Tessky, Esslingen, Fed. Rep. of Germany

[21] Appl. No.: 933,010

[22] Filed: Nov. 20, 1986

Related U.S. Application Data

[62] Division of Ser. No. 636,886, Aug. 2, 1984, Pat. No. 4,635,340.

[30] Foreign Application Priority Data

Aug. 5, 1983 [DE] Fed. Rep. of Germany ....... 3328327

[51] Int. Cl.$^4$ ............................ B23B 5/44; B23B 5/36
[52] U.S. Cl. .......................................... 82/18; 82/2 R; 82/36 A; 29/558; 29/27 A; 29/27 R; 51/54; 51/55; 409/132; 409/166; 409/211; 408/35
[58] Field of Search .................. 82/2 R, 36 A, 18; 29/27 C, 558, 33 J, 40, 42, 47, 558; 408/35; 409/131, 132, 84, 183, 196, 204, 208, 166, 211; 51/281 R, 288, 54, 55

[56] References Cited

U.S. PATENT DOCUMENTS

| | | | |
|---|---|---|---|
| 3,958,471 | 5/1976 | Muller | 82/18 |
| 4,180,894 | 1/1980 | Link | 29/27 C |
| 4,635,340 | 1/1987 | Link | 82/18 |

FOREIGN PATENT DOCUMENTS

| | | |
|---|---|---|
| 2356612 | 5/1975 | Fed. Rep. of Germany . |
| 3239314 | 4/1984 | Fed. Rep. of Germany . |
| 161513 | 7/1980 | Japan ...................... 82/18 |

OTHER PUBLICATIONS

Traub CNC–Doppelschlittendrehautomat, 1983, p. 7.
Zusatz–Einrichtungen erweitern den Anwendungsbereich, LINK, 1966, periodical Werkstatt und Betrieb, p. 641.
CNC–Steuerung ermoglicht Frasenauf der Drehmaschine, 1983, Moderne Fertigung, pp. 8 to 10.

Primary Examiner—Nicholas P. Godici
Assistant Examiner—Jerry Kearns
Attorney, Agent, or Firm—Neuman, Williams, Anderson & Olson

[57] ABSTRACT

A method of machining a workpiece, which is rotatable about a first axis, by a tool pivotable about a second axis parallel to the first axis and drivable about a third axis perpendicular to the second axis. To allow the circumference of the workpiece to be machined off-center without the necessity of moving the first or the second axis transversely to the plane defined by these two axes, the workpiece and the tool are rotated or pivoted about the first or second axis, respectively, at the same time, in the same direction and at the same angular velocity and, simultaneously the second axis is displaced transversely to the first axis at such a velocity that the equation $X^2 = Y^2 + A^2$ always applies, wherein X is the distance of the second axis from the first axis, Y is the distance of the first axis from the plane defined by the second and third axes and A is the distance of the second axis from the vertical projection of the first axis onto this plane.

14 Claims, 10 Drawing Figures

METHOD OF MACHINING A WORKPIECE IN A TURRET LATHE AND AN NC LATHE FOR PERFORMING THIS METHOD

This is a division of application Ser. No. 636,886 filed Aug. 2, 1984 and now U.S. Pat. No. 4,635,340 the text of which is hereby incorporated by reference.

The invention deals with an NC lathe comprising a main spindle adapted to be driven about a main spindle axis by a main motor and having a workpiece chuck means, a tool turret arranged adjacent the work spindle and adapted for rotation by a turret indexing motor about a turret axis parallel to the main spindle axis, the tool turret having a turret body in which at least one auxiliary spindle for holding a tool is rotatably mounted and adapted to be driven about an auxiliary spindle axis extending radially to the turret axis, also comprising a carriage bearing the tool turret and adapted for displacement transversely to the main spindle axis by means of a carriage drive, and also comprising an NC system for controlled transverse displacement of the carriage and for controlled rotation of the main spindle and the tool turret.

With conventional lathes of this type, bores, also tapped bores, grooves and other recesses may be machined into the workpiece, when the main spindle is stationary, by the driven tools carried by the tool turret, such as drills and milling tools, as long as the axes of these bores, grooves etc. are located, during machining, in the plane defined by the main spindle axis and the turret axis and either extend parallel to or intersect the main spindle axis. On lathes, with which it is not possible for either the main spindle to be displaced transversely to the main spindle axis or the tool turret at right angles to the plane defined by the main spindle axis and the turret axis, it has not so far been possible to machine the circumference of the workpiece off-center (in relation to the main spindle axis or the plane defined by this axis and the turret axis), e.g. to drill a bore into the workpiece from its circumference when the axis of this bore does not intersect the main spindle axis. Machining centers have previously had to be used for work of this type. Lathes, with which the main spindle can be displaced transversely to the main spindle axis or the tool turret at right angles to the plane defined by the main spindle axis and the turret axis, are however expensive and complicated in their construction. In addition, when the main spindle has to be displaced at right angles to its axis only so-called chuck parts can be machined, i.e. it is not possible to hold the workpiece on both sides during machining, namely on one side in the main spindle and, on the other, on the center of a tailstock or the like. Finally, the construction and stability of a lathe suffer when the tool turret also has to be displaceable at right angles to the plane defined by the axes of the main spindle and turret.

In the following, the customary axis directions of a lathe are introduced and defined so that the invention can be described more easily:

Z-axis = feed motion in the direction of the main spindle axis away from the headstock X-axis = feed motion towards the front in the direction of the turret axis which extends at right angles to the main spindle axis Y-axis = feed motion upwardly in the direction perpendicular to the plane defined by the main spindle axis and the aforesaid turret axis C-axis = feed motion in the direction of rotational movement about the main spindle axis The lathes described above, with which neither the main spindle nor the turret can be displaced perpendicularly to the plane defined by the main spindle axis and the turret axis, do not have a Y-axis, i.e. they do not allow any feed motion in the direction of the Y-axis.

The object underlying the invention was to create a method of machining a workpiece in a turret lathe not having a Y-axis which allows the circumference of a workpiece to be machined off-center. Proceeding on the basis of a method, with which a workpiece carried by a main spindle is rotated about the main spindle axis, a tool turret having an axis parallel to the main spindle axis is displaced transversely to the main spindle axis and a tool driven about a tool axis extending radially to the turret axis is pivoted about the turret axis, this object is accomplished in accordance with the invention in that the workpiece is rotated about the main spindle axis and the tool pivoted about the turret axis simultaneously, in the same direction and at the same angular velocity and that the tool turret is meanwhile displaced transversely to the main spindle axis at such a velocity that the following always applies:

$$X^2 = Y^2 + A^2$$

wherein X, Y and A denote the following:

X = the distance of the turret axis from the main spindle axis;

Y = the distance of the main spindle axis from the plane defined by the turret axis and the tool axis, this plane pivoting about the turret axis;

A = the distance of the turret axis from the projection of the main spindle axis onto the aforesaid plane.

Since the main spindle of any NC lathe can be driven, i.e. rotated, continuously and in a controlled manner with respect to its angle of rotation, use of the inventive method merely presupposes that the tool turret can also be rotated about the turret axis continuously and in a controlled manner with respect to its angle of rotation. The latter does not necessitate any appreciable additional expenditure or resources since all NC lathes monitor the angle of rotation of the tool turret anyway. Attention must be paid merely to the fact that the tool turret can be rotated continuously about its axis and stopped in any angular position, which is not the case with the conventional NC turret lathes. The tool turrets of these lathes may be stopped only in a certain number of angular positions corresponding to the number of stations they have.

The inventive method may therefore be carried out on NC turret lathes which have the simple construction and stability of lathes not having a Y-axis and still allow machining work to be done as if they had a Y-axis, i.e. feed motion to the tool turret or main spindle at right angles to the plane defined by the axes of the main spindle and the turret. In addition, such machining work may be carried out, with the aid of the inventive method, on workpieces which are held on both sides, i.e. in the main spindle as well as, for example, on a tailstock center.

As a rule, the workpiece is rotated continuously about the main spindle axis and the tool pivoted continuously about the turret axis. However, if long chips are to be avoided during drilling it is recommended that X, $\gamma$ and the position of the workpiece with respect to its angle of rotation be altered intermittently.

The above-mentioned condition (equation I) must always apply irrespective of whether the tool has a constant feed velocity or a variable feed velocity with respect to time in relation to the workpiece. As a rule, the aim is to have a constant feed velocity. For this reason, the inventive method is advantageously developed such that to achieve a constant feed velocity of the tool relative to the workpiece which is brought about by their rotational and pivoting movement the rotational movement of the workpiece and the pivoting movement of the tool are coordinated with the transverse displacement of the tool turret such that the following always applies:

$$\gamma = \arctan Y/A \qquad \text{(equation II)},$$

wherein $\gamma$ = the angle between the tool axis and the plane defined by the axes of the main spindle and the turret.

If a surface is to be provided on the circumference of the workpiece parallel to the main spindle axis and it is accepted that the feed velocity of the tool relative to the workpiece is not exactly constant, it is recommended that the tool turret be displaced in a transverse direction towards the main spindle axis as a function of the angle of rotation of the workpiece or the angle of pivot of the tool such that the following always applies:

$$X = A/\cos\gamma \qquad \text{(equation III)},$$

wherein A and $\gamma$ denote the following:

X = the radial distance of the turret axis from the end of the tool facing away from the latter plus the distance of the main spindle axis from the surface to be made;

$\gamma$ = the angle between the plane defined by the axes of the main spindle and turret and the tool axis or rather the perpendicular to the surface to be made.

If a bore is to be made, the axis of which does not intersect the main spindle axis, and if it is again accepted that the feed velocity is not exactly constant with respect to time, it is recommended that the inventive method be developed such that the workpiece be rotated about the main spindle axis and the tool pivoted about the turret axis as a function of the distance X between the main spindle axis and the turret axis and as a function of the distance Y between the bore axis and the main spindle axis such that the following always applies:

$$\gamma = \arcsin Y/X \qquad \text{(equation IV)},$$

wherein $\gamma$ equals the angle between the tool axis or rather the bore axis and the plane defined by the main spindle axis and the turret axis.

When carrying out the inventive method it is, of course, possible for feed movements to occur along three or four axes simultaneously in that, for example, work is done with a milling tool as described above for drilling a bore but with a simultaneous feed movement in the direction of the Z-axis.

A particularly suitable NC lathe for carrying out the inventive method is one comprising a main spindle adapted to be driven about a main spindle axis by a main motor and having a workpiece chuck means, a tool turret arranged adjacent the work spindle and adapted for rotation by a turret indexing motor about a turret axis parallel to the main spindle axis, the tool turret having a turret body in which at least one auxiliary spindle for holding a tool is rotatably mounted and adapted to be driven about an auxiliary spindle axis extending radially to the turret axis, also comprising a carriage bearing the tool turret and adapted for displacement transversely to the main spindle axis by means of a carriage drive, and also comprising an NC system for controlled transverse displacement of the carriage and for controlled rotation of the main spindle and the tool turret. The invention thereby provides that the tool turret is adapted to be rotated by the turret indexing motor and the NC system continuously and controlled as to its angle of rotation and that rotations of the main spindle and the tool turret in the same direction as well as transverse displacement of the carriage are controllable simultaneously by the NC system such that the aforesaid equation I always applies.

As already mentioned, the main spindle may be driven by the main motor, as during normal lathe work, when carrying out the inventive method. A greater accuracy is, however, achieved when a C-axis motor which is controlled by the NC system and an angular position transducer connected to the main spindle is provided for controlled drive of the main spindle with respect to its angle of rotation, especially when the C-axis motor drives the main spindle via a worm gear since in this case movement about the C-axis may be resolved to an extremely high degree. If normal work, i.e. turning, is carried out with the main spindle, the C-axis motor could be rotated therewith in an idling state. It is, however, more favorable for an actuable coupling to be arranged between the C-axis motor and the main spindle so that the C-axis motor can be stopped during normal lathe work. When using a worm gear between the C-axis motor and the main spindle it is necessary to provide the actuatable coupling between this worm gear and the main spindle.

In embodiments having a separate C-axis motor, this motor advantageously constitutes the turret indexing motor as well even if embodiments are, of course, possible, in which a separate turret indexing motor is arranged on the turret carriage and drives the turret in particular via a worm gear. If a single motor is used both for the inventive drive of the main spindle and for rotating the turret, an embodiment is recommended, in which a gear unit is provided between a first gear wheel connected to the main spindle and a second gear wheel connected to the tool turret. This gear unit comprises a freely movable intermediate shaft extending transversely to both the main spindle axis and the turret axis, third and fourth gear wheels non-rotatably connected to the intermediate shaft, a pair of belts or chains, the first of which runs over the first and third gear wheels and the second of which runs over the second and fourth gear wheels, as well as a pair of arms, the first of which is pivotable about the main spindle axis and the second about the turret axis and both of which are pivotable about the intermediate shaft. Owing to these arms, the gear elements which drive the main spindle and the turret and are designed in particular as worm gears are not subject to any belt or chain tension loads. When the first and third gear wheels are of the same size and the second and fourth gear wheels are also of the same size, no errors with respect to the angle of rotation at the turret occur even when the turret carriage is displaced in the direction of the X-axis and/or the Z-axis.

When the C-axis motor also drives the turret, it is recommended that an actuatable coupling be provided between the main spindle and the tool turret, preferably directly before the worm gear for the tool turret, so that the tool turret can be uncoupled when the main spindle is to be rotated alone. In addition, a blocking device is associated with the tool turret so that the uncoupled tool turret can be stopped.

A requirement always made of turret lathes having driven turret tools is that the turret tools are driven with relatively high power and within a broad range of rotational speeds. This requirement can, of course, be fulfilled with a controllable direct-current motor of large dimensions arranged on the turret carriage. However, this is not only the most expensive solution but also has a serious additional disadvantage in that the turret carriage is hardly able to accommodate a relatively large motor.

In accordance with the invention, it is therefore suggested for a turret lathe having at least one drivable auxiliary spindle in the tool turret and an auxiliary spindle drive shaft concentric to the turret axis that the stationary main motor be connected to the drive shaft of the auxiliary spindle via a gear unit. This gear unit comprises a first gear wheel on a main drive shaft which is parallel to the turret axis and driven by the main motor, a second gear wheel on the drive shaft of the auxiliary spindle, a freely movable intermediate shaft parallel to the main drive shaft as well as third and fourth gear wheels non-rotatably connected to the intermediate shaft and a pair of belts or chains, the first of which runs over the first and third gear wheels and the second over the second and fourth gear wheels. It is also suggested that a pair of arms be provided, the first of which is pivotable about the main drive shaft and the second about the drive shaft of the auxiliary spindle and both of which are pivotable about the intermediate shaft. Such a gear unit has the same advantages as those explained in the aforesaid when using a corresponding gear unit between the main spindle and the turret. Therefore, the idea of also driving the turret tools via the main motor and the gear unit described above is practicable and advantageous independently of the inventive suggestions described earlier.

Additional features and advantages of the invention are specified in the attached claims and/or the following description as well as the attached drawings of several preferred embodiments of the inventive lathe. In the drawings.

First of all, the fundamental construction of an inventive NC turret lathe will be explained on the basis of FIGS. 1 and 2. This corresponds to a great extent to the construction of assignee's lathe which is described in German Utility Model No. 82 29 813 as well as in German patent application No. P 32 39 314.8.

A bed 10 supports a headstock 12, in which a main spindle 14 is rotatably mounted about a main spindle axis 16. The main spindle bears on one side a belt pulley 18 and on the other a workpiece chuck means 20, in which a workpiece 22 may be held. A main motor 24 mounted on the bed 10 drives the main spindle 14 via a belt pulley 26 and a drive belt 28.

Figure 6:
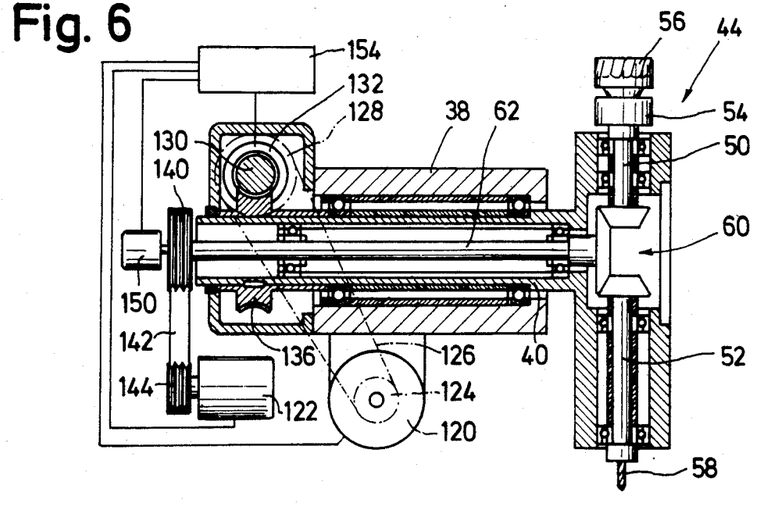
FIG. 6 is a further section taken from FIG. 1 showing in detail the rotational drive of the turret.

A first cross slide system 30 is located adjacent the headstock 12 in the plan view and in front of it in the front view. This cross slide system has stationary guideways 32, in which a lower carriage 34 is guided for displacement in the X direction, i.e. along these guideways. This lower carriage has guideways 36 for an upper carriage 38, in which a turret support shaft 40 is rotatably mounted about a turret axis 42. A tool turret, designated as a whole as 44, is mounted on the front end of the shaft 40. The tool turret has a turret body 46, in which, as shown in FIG. 6, a plurality of auxiliary spindles 50, 52 are rotatably mounted. These auxiliary spindles extend radially to the turret axis 42 and each carries a tool chuck means 54, in which, for example, a milling tool 56 or a drill bit 58 can be secured. The auxiliary spindles are jointly driven by a bevel gearing 60 within the turret body 46 as well as a central auxiliary spindle drive shaft 62 which is rotatably mounted in the turret support shaft 40.

The lower carriage 34 is displaced along the guideways 32 by a lower carriage motor 66 and a ball screw spindle 68. The ball screw spindle 68 thereby crosses with the headstock 12 beneath the main spindle 14. This construction is described in greater detail in German Utility Model 82 29 813 and German patent application No. P 32 39 314.8. The upper carriage 38 is driven by an upper carriage motor 70 mounted on the lower carriage 34 and a ball screw spindle 72 see FIG. 1.

Finally, the lathe has a second cross slide system 74 with stationary guideways 76 and a lower carriage 78 which is displaceable along these guideways. The lower carriage has guideways 80, in which an upper carriage 82 is guided for displacement along them. This carriage also serves to mount a turret support shaft 84, to which a second tool turret 86 is secured.

The lathe illustrated and described thus far conforms to the state of the art.

Figure 1:
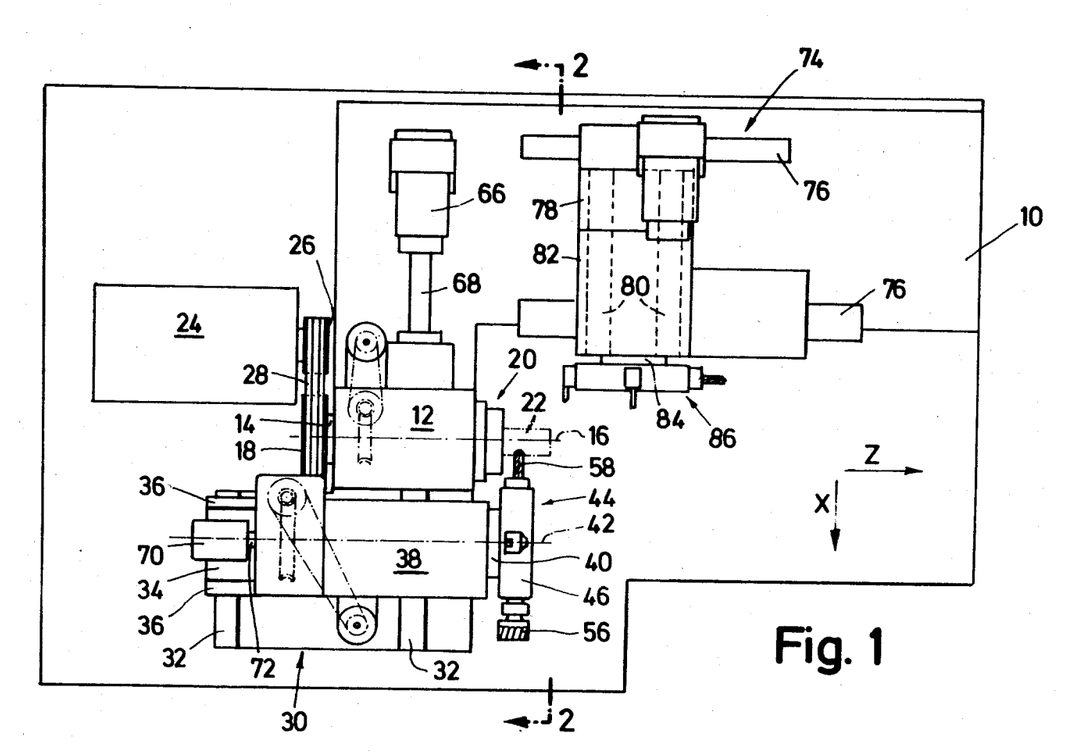
FIG. 1 is a plan view of a first embodiment with two separate motors which are monitored with respect to their angles of rotation and drive the main spindle and the tool turret via their respective worm gears.
Figure 2:
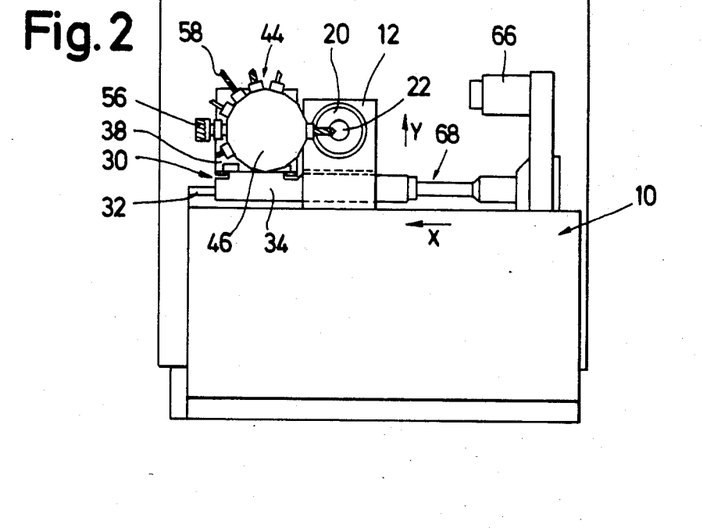
FIG. 2 is a cross section along line 2—2 in FIG. 1.

FIGS. 1 and 2 also show the customary axis designations, as explained at the beginning, which are designated by the usual letters and arrows pointing in the positive direction.

The inventive innovations of the first embodiment of the lathe will now be explained on the basis of FIGS. 5 and 6.

Figure 5:
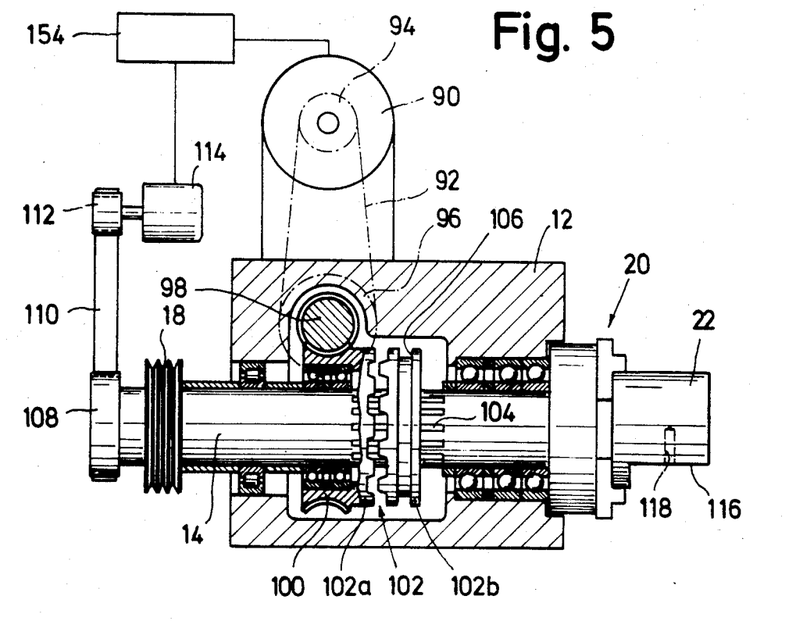
FIG. 5 is a section taken from FIG. 1 showing in detail how the main spindle is driven with the aid of a C-axis motor.

As shown in FIG. 5, a C-axis motor 90 is mounted on the headstock 12. This motor drives a worm 98, which is rotatably mounted on the headstock, via a toothed belt 92 and a pair of toothed pulleys 94 and 96. The axis of this worm extends at right angles to the plane of drawing in FIG. 5. The worm meshes with a worm wheel 100 rotatably mounted on the main spindle 14. One half 102a of a coupling designated as a whole as 102 is molded onto this worm wheel. The other half 102b of the coupling is non-rotatably seated for longitudinal displacement on the main spindle 14 by means of splines 104 and can be moved out of its disengaged position shown in FIG. 5 by means of a circumferential groove 106 and customary actuating means which engage in this groove but are not illustrated. This second half 102b of the coupling is then moved to the left in FIG. 5 and engages with the first half 102a of the coupling. In this engaged position, the main spindle 14 can be driven by the C-axis motor 90. Finally, a toothed belt pulley 108 is secured to the rearward end of the main spindle 14, which is coupled via this toothed belt pulley, a toothed belt 110 and a second toothed belt pulley 112 to an angular position transducer 114 which is mounted on the headstock 12 in a manner not illustrated. FIG. 5 finally shows a workpiece 22 which has been worked in the way typical of the inventive method and has a flat surface 116 on its circumference as well as a bore 118 drilled off-center into the workpiece from its circumference.

FIG. 6 will now be used as a basis for describing how, in the first embodiment of the inventive lathe, the tool turret 44 is rotated and the auxiliary spindles 50, 52 driven. To this end, a turret indexing motor 120 and an auxiliary spindle drive motor 122 are mounted on the upper carriage 38. The turret indexing motor drives a worm 130 rotatably mounted in the upper carriage 38 via a toothed belt pulley 124, a toothed belt 126 and a second toothed belt pulley 128. The axis of this worm 130 extends at right angles to the plane of drawing in FIG. 6 and the worm is connected to an angular position transducer 132 held on the upper carriage 38. A gear wheel 136 is mounted on the turret support shaft 40 which is rotatably mounted in the upper carriage 38 and so the turret support shaft 40 may be driven with the aid of the turret indexing motor 120 such that its angle of rotation or rather its position is controlled. A belt pulley 140 is secured to the rearward end of the auxiliary spindle drive shaft 62 which can be driven by the auxiliary spindle drive motor 122 via this belt pulley, a drive belt 142 and a second belt pulley 144. So that it is also possible to control the angle of rotation or rather the position of the turret tools 56, 58 a further angular position transducer 150 is mounted on the upper carriage 38 and driven by the auxiliary spindle drive shaft 62.

As shown finally in FIGS. 5 and 6, an NC system 154 is electrically connected to the C-axis motor 90, the turret indexing motor 120 as well as to the auxiliary spindle drive motor 122 and the angular position transducers 114, 132 and 150. The motors are therefore switched on and off by the NC system and it is possible to drive and stop the main spindle 14, the turret support shaft 40 and the auxiliary spindles 50, 52 such that their position, i.e. their angle of rotation, is controlled.

The inventive machining method will now be explained on the basis of FIGS. 3 and 4 and using the inventive lathe.

Figure 3:
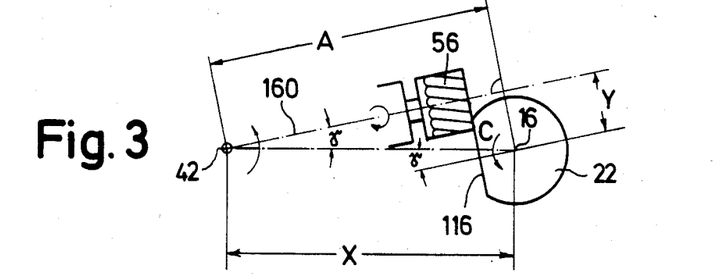
FIG. 3 is a detail taken from FIG. 2 to illustrate how a flat surface is made on the circumference of a workpiece with the aid of the inventive method.
Figure 4:
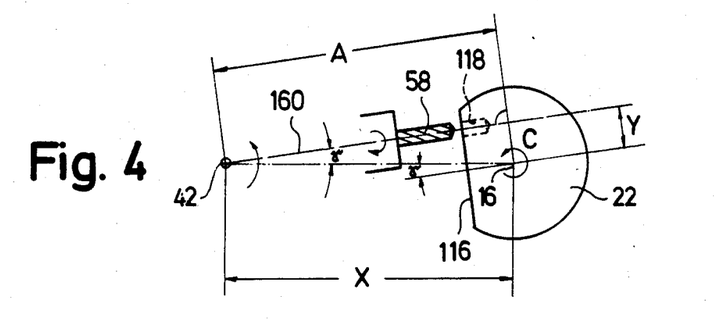
FIG. 4 is a corresponding detail taken from FIG. 2 to illustrate how a bore, the axis of which does not intersect the main spindle axis, is drilled into the workpiece from its circumference with the aid of the inventive method.

FIG. 3 shows how the flat surface 116 shown in FIG. 5 is produced with the aid of the milling tool 56 shown in FIG. 6. To this end, the workpiece 22 is rotated with the aid of the main spindle 14 about the main spindle axis 16 in the direction of the arrow and, simultaneously, the driven milling tool 56 is pivoted about the turret axis 42 in the direction of the arrow and at the same angular velocity as that at which the workpiece is rotated.

In addition, by driving the lower carriage 34, the turret 44 is first moved toward the main spindle axis 16 in order to approach the same, and after the axis of the tool 56 has passed the plane defined by the axes 16 and 42, is then moved away from the axis. During such movement the following equation always applies:

$$X^2 = Y^2 + A^2,$$

wherein X, Y and A denote the following;

X = the distance of the turret axis 42 from the main spindle axis 16;

Y = the distance of the main spindle axis 16 from the plane defined by the turret axis 42 and the axis 160 of the milling tool 56, this plane pivoting about the turret axis 42 (plane at right angles to the plane of drawing in FIG. 3 through the tool axis 160);

A = the distance of the turret axis 42 from the projection of the main spindle axis 16 onto the aforesaid plane.

A constant feed velocity $v_y$ of the milling tool 56 in the plane of the flat surface 116 to be produced, relative to the workpiece 22, results when the following always applies:

$$X = \sqrt{A^2 + (Y_o - v_y \cdot t)^2}$$

$$\gamma = \arctan \frac{Y_o - v_y \cdot t}{A}$$

$$A = \text{const.},$$

wherein $\gamma$ equals the angle between the tool axis 160 and the plane defined by the main spindle axis 16 and the turret axis 42 or rather between this plane and the perpendicular to the flat surface 116 to be made, $Y_o$ is the value of Y at which the milling tool touches the workpiece for the first time and t is the time which is equal to zero when $Y = Y_o$.

As shown in FIG. 3, rotation of the workpiece 22 along the C-axis, i.e. about the main spindle axis 16, in conjunction with a simultaneous pivoting of the milling tool in the same direction about the turret axis 43 leads to a feed motion of the tool relative to the workpiece which corresponds to a feed motion in the direction of the Y-axis (see FIG. 2).

FIG. 4 again shows the bore 118 indicated in FIG. 5, the axis of which is spaced from the main spindle axis. The bore can be drilled in that the workpiece 22 is rotated with the aid of the main spindle 14 about the main spindle axis 16 in the direction of the arrow, the upper carriage 38 is moved simultaneously towards the main spindle axis 16 with the drill bit 58 in operation and the drill bit 58 is pivoted about the turret axis 42 simultaneously and in the same direction as the rotational movement of the workpiece 22 and at the same angular velocity, the rotational or pivoting movement thereby being controlled such that the following always applies:

$$Y = \sqrt{X^2 - A^2} = \text{const.}$$

A constant feed velocity $v_A$ of the drill bit 58 relative to the workpiece 22 results when the following always applies:

$$X = \sqrt{(A_0 - v_A \cdot t)^2 + Y^2}$$

$$\gamma = \arctan \frac{Y}{A_0 - v_A \cdot t},$$

wherein $A_0$ is the value of A at which the drill bit touches the workpiece for the first time and t is the time which is equal to zero when $A = A_0$.

This again shows quite clearly that a rotational movement of the workpiece 22 about the main spindle axis 16 (C-axis movement) and a corresponding pivoting movement of the tool about the turret axis 42 achieve the same result as a feed motion along the Y-axis (see FIG. 2).

Figure 7:
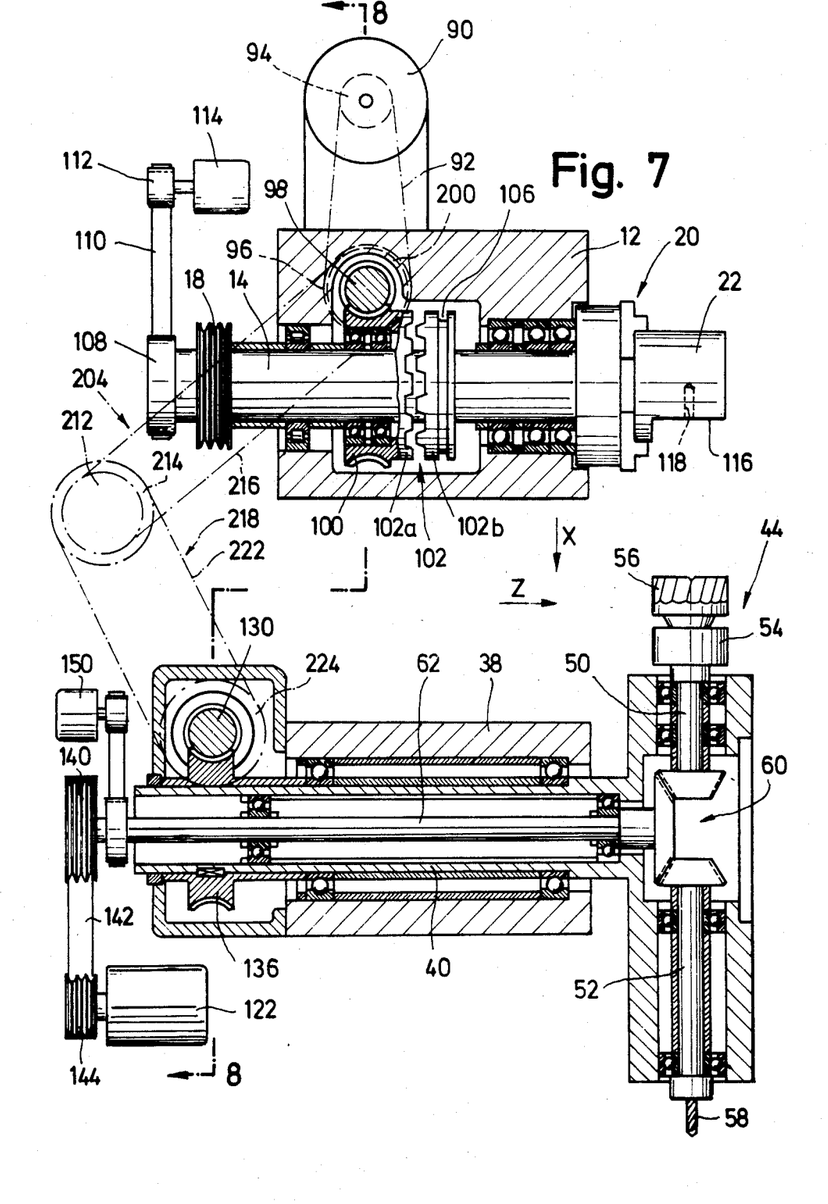
FIG. 7 is an illustration corresponding to FIGS. 5 and 6 and showing a second embodiment, with which the C-axis motor also drives the tool turret.
Figure 8:
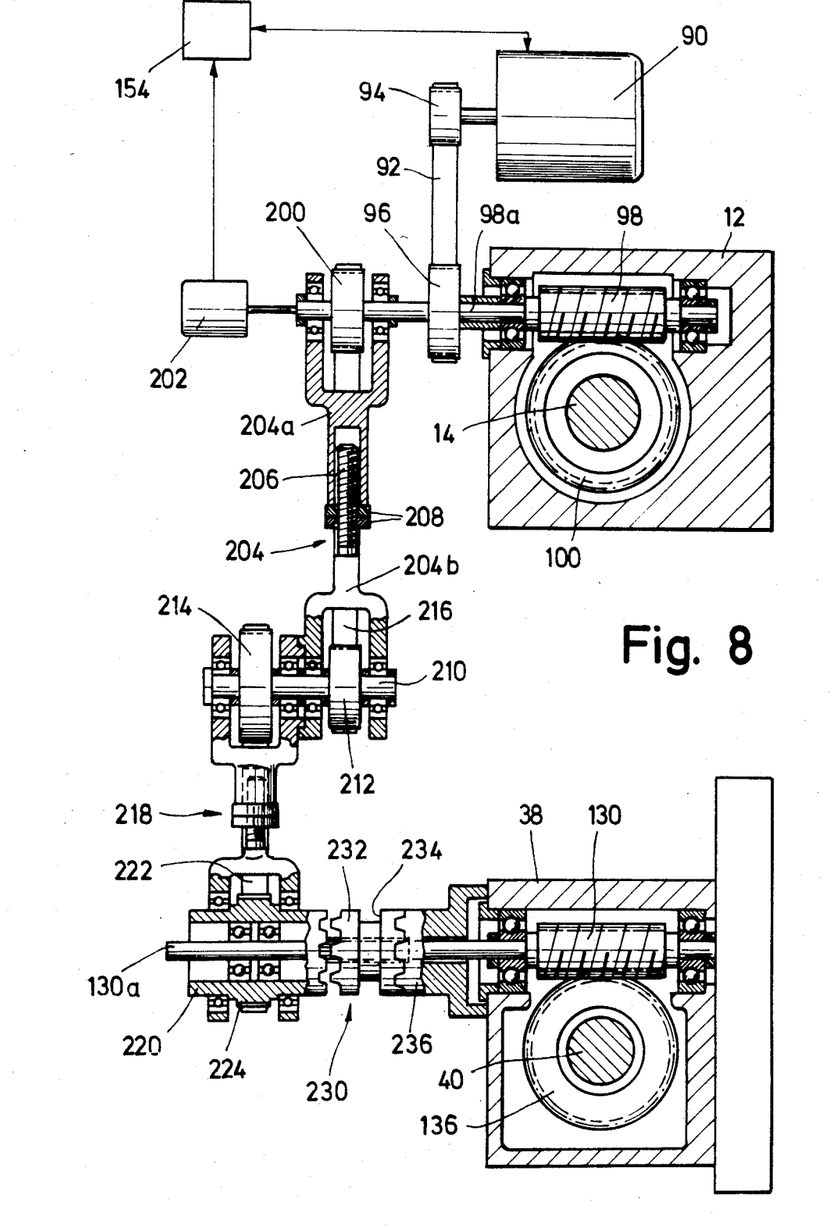
FIG. 8 is a section along line 8—8 of the parts shown in FIG. 7.

The second embodiment of the inventive lathe, as illustrated in FIGS. 7 and 8, differs from the first embodiment shown in FIGS. 1 to 6 merely in that the C-axis motor 90 also drives the turret support shaft 40. In the following, therefore, only the differences will be described and the same reference numerals will be used for those parts which correspond to the parts of the embodiment shown in FIGS. 5 and 6.

This second embodiment has a toothed belt pulley 200 attached to an axis 98a of the worm 98. In addition, the axis 98a directly drives an angular position transducer 202, with the aid of which, as well as with the aid of the NC system 154, the main spindle 14 can be rotated and stopped such that its position or rather angle of rotation is controlled. An arm designated as a whole as 204 is mounted on the axis 98a for pivoting movement. It consists of two forked elements 204a and 204b which can be adjusted and fixed relative to one another in the longitudinal direction of a threaded bolt 206 by means of a telescopic guide, which is not illustrated in detail, the threaded bolt 206 and a nut 208. The element 204b is rotatably mounted on a freely movable shaft 210 so that the arm 204 can also pivot about the shaft 210. A pair of toothed belt pulleys 212 and 214 is mounted on this shaft and a first toothed belt 216 runs over the toothed belt pulleys 200 and 212. A second arm 218 is constructed in the same way as the arm 204 and it is therefore unnecessary to describe it in detail. This arm is pivotable not only about the shaft 210 but also about a drive sleeve 220 and serves to receive the tension forces of a toothed belt 222 which runs over the toothed belt pulley 214 and a toothed belt pulley 224 formed by the drive sleeve 220. The drive sleeve 220 is rotatably mounted on a worm shaft 130a rigidly connected to the worm 130 and forms part of a coupling designated as a whole as 230. This coupling has a driver 232 which is displaceable along the worm shaft 130a and is non-rotatably connected to this shaft by, for example, splines which are not illustrated. It also has a circumferential groove 234, in which activating means for the coupling 230 are intended to engage. These activating means are not illustrated. The driver 232 can be non-rotatably connected to either the drive sleeve 220 or a tubular support 236 by means of the illustrated teeth. The tubular support encircles the worm shaft 130a concentrically and is molded onto the upper carriage 38. In the NC position of the driver 232 shown in FIG. 8, the turret support shaft 40 is disengaged from the C-axis motor 90 and blocked. If the driver 232 is displaced to the left in FIG. 8 the worm 130 is coupled to the C-axis motor 90 and can be driven by it. At the same time, the gear unit shown in FIG. 8 between the worm shaft 98a and the drive sleeve 220 allows the upper carriage 38 to be displaced in the direction of the X and Z-axes without such movements causing any errors at the worm 130 or the turret support shaft 40 with respect to angles of rotation when the toothed belt pulleys 200 and 212 are of the same size and the toothed belt pulleys 214 and 224 are also of the same size.

Figures 9, 10:
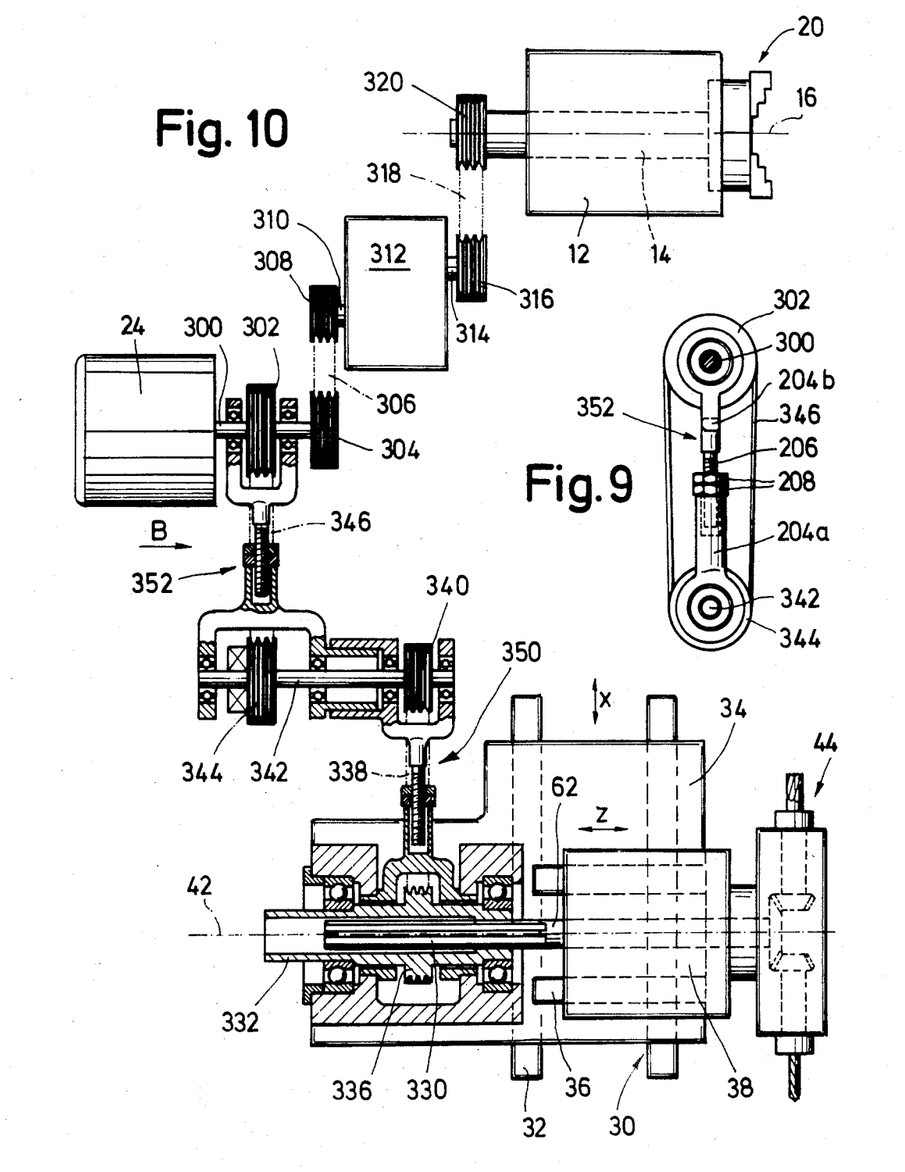
FIG. 9 is a plan view of one of the arms of the gear unit shown in FIG. 10 and seen in the direction of arrow B in FIG. 10
FIG. 10 is an illustration corresponding to FIG. 7 and showing a third embodiment, with which the main motor driving the main spindle also drives the tools of the tool turret.

In the third embodiment shown in FIG. 10, the main motor 24 shown in FIG. 1 is used to drive not only the main spindle 14 but also the turret tools. Two belt pulleys 302 and 304 are mounted on the shaft 300 of the main motor 24, the belt pulley 304 driving a primary shaft 310 of an actuatable gear unit 312 via drive belts 306 and a belt pulley 308. This gear unit allows the main spindle 14 to be driven by the main motor 24 at various gear ratios and it can also be switched to an idling setting. A belt pulley 316 is mounted on an output shaft 314 of the gear unit 312 so that the main spindle 14 may be driven by the main motor 24 via drive belts 318 and a belt pulley 320 mounted on the main spindle.

The auxiliary spindle drive shaft 62 is non-rotatably connected via splines 330 to a drive sleeve 332 which is rotatably mounted in the lower carriage 34 but is not axially displaceable. In this way, it is possible to displace the upper carriage 38 in the direction of the Z-axis with the auxiliary spindle drive shaft 62. A belt pulley 336 is molded onto the drive sleeve 332 and drive belts 338 run over this to a belt pulley 340 which is mounted on an intermediate shaft 342. The latter bears a second belt pulley 344, over which drive belts 346 run to belt pulley 302.

Two belt tension arms 350 and 352 are pivotable about either the drive sleeve 332 and the intermediate shaft 342 or the shaft 300 and the intermediate shaft 342. Their construction corresponds to that of the arms 204 and 218 illustrated in FIGS. 8 and 9 and need not be described in detail. The inventive gear unit between the shaft 300 of the main motor 24 and the auxiliary spindle drive shaft 62 therefore allows the tool turret 44 to be displaced at will along both the Z and X-axes. Such movements do not result in any superimposed rotational movements when the belt pulleys 302 and 344 have the same diameter and the belt pulleys 336 and 340 also have the same diameter.

What is claimed is:

1. In an NC lathe, comprising a main spindle mounted for rotation in a spindle stock about a main spindle axis; a main motor for rotatably driving said main spindle about said main spindle axis; a workpiece chuck means mounted on said main spindle; a tool turret arranged adjacent said main spindle; means for rotatably mounting said tool turret; means for rotatably driving said tool turret about a tool turret axis parallel to the main spindle axis; said tool turret comprising a turret body and at least one turret spindle for holding a tool rotatably mounted in said turret body; means for rotatably driving said turret spindle about a turret spindle axis extending radially to the turret axis; a carriage bearing said tool turret for slidable displacement transversely to the main spindle axis, and a carriage drive for slidably displacing said carriage, the improvement comprising NC control means operatively connected to said main motor, the tool turret driving means, and said carriage drive for effecting controlled, stepless, transverse displacement of the carriage and controlled stepless rotation of the main spindle and of the tool turret such that simultaneously
  (a) the main spindle is rotated about the main spindle axis in a defined direction of rotation and with a defined angular velocity $d\gamma/dt$;
  (b) the turret spindle is rotated about the turret spindle axis;
  (c) the turret is rotated about the turret axis in the defined direction of rotation and with said defined angular velocity;
  (d) the carriage is displaced transversely to the main spindle axis at a velocity $dX/dt$
said velocities being the first derivatives of the following equations:

$$\gamma = \arctan \frac{Y_o - v_y \cdot t}{A}$$

$$X = \sqrt{A^2 + (Y_o - v_y \cdot t)^2}$$

wherein t, $\gamma$, X, A, $Y_o$, and $v_y$ denote the following:
  t = the time which is equal to zero when a tool carried by said turret spindle touches a workpiece carried by said chuck means for the first time;
  $\gamma$ = the angle between the turret spindle axis and a first plane defined by the main spindle axis and the turret axis;
  X = the distance of the turret axis from the main spindle axis;
  A = the distance of the turret axis from the normal projection of the main spindle axis onto a second plane defined by the turret axis and the turret spindle axis, which plane pivots about the turret axis;
  Y = the distance of the main spindle axis from said second plane, with $Y_o$ being the value of Y when t equals zero;
  $v_y$ = the feed velocity $dy/dt$ of the turret spindle axis relative to the main spindle axis in the direction of diminishing values of Y.

2. In an NC lathe, comprising a main spindle mounted for rotation in a spindle stock about a main spindle axis; a main motor for rotatably driving said main spindle about said main spindle axis; a workpiece chuck means mounted on said main spindle; a tool turret arranged adjacent said main spindle; means for rotatably mounting said tool turret; means for rotatably driving said tool turret about a tool turret axis parallel to the main spindle axis; said tool turret comprising a turret body and at least one turret spindle for holding a tool rotatably mounted in said turret body; means for rotatably driving said turret spindle about a turret spindle axis extending radially to the turret axis; a carriage bearing said tool turret for slidable displacement transversely to the main spindle axis, and a carriage drive for slidably displacing said carriage, the improvement comprising NC control means operatively connected to said main motor, the tool turret driving means and said carriage drive for effecting controlled stepless transverse displacement of the carriage and controlled stepless rotation of the main spindle and of the tool turret such that simultaneously
  (a) the main spindle is rotated about the main spindle axis in a defined direction of rotation and with a defined angular velocity $d\gamma/dt$;
  (b) a turret spindle is rotated about the turret spindle axis;
  (c) the turret is rotated about the turret axis in the defined direction of rotation and with said defined angular velocity;
  (d) the carriage is displaced transversely to the main spindle axis at a velocity $dX/dt$
said velocities being the first derivatives of the following equations:

$$\gamma = \arctan \frac{Y}{A_o - v_A \cdot t}$$

$$X = \sqrt{(A_o - v_A \cdot t)^2 + Y^2}$$

wherein t, X, Y, $A_o$, and $v_A$ denote the following:
  t = the time which is equal to zero when a tool carried by the turret spindle touches a workpiece carried by said chuck means for the first time;
  $\gamma$ = the angle between the turret spindle axis and a first plan defined by the main spindle axis and the turret axis;
  X = the distance of the turret axis from the main spindle axis;
  A = the distance of the turret axis from the normal projection of the main spindle axis onto a second plane defined by the turret axis and the turret spindle axis, which plane pivots about the turret axis, with $A_o$ being the value of A when t equals zero;
  Y = the distance of the main spindle axis from said second plane;
  $V_A$ = the feed velocity $dA/dt$ of the turret body relative to the main spindle in the direction of diminishing values of A.

3. The lathe of claim 1 or 2, in combination with a C-axis motor controlled by said NC control means, and an angular position transducer connected to the main spindle is provided for controlled drive of the main spindle with respect to its angle of rotation.

4. The lathe of claim 3, wherein an actuatable coupling connects the C-axis motor to the main spindle.

5. The lathe as defined in claim 4, wherein the C-axis motor is the turret indexing motor.

6. The lathe as defined in claim 5, in which an actuatable coupling is provided between the main spindle and the tool turret, and an actuatable blocking device is associated with the tool turret for stopping said tool turret.

7. The lathe of claim 5, in combination with a first gear wheel in drive connection with the main spindle and mounted on an axis which is stationary relative to the main spindle axis, and a second gear wheel in drive connection with the tool turret mounted on an axis which is stationary in relation to the turret axis and parallel to the axis of the first gear wheel; a gear unit arranged between said first and second gear wheels comprising a freely movable intermediate shaft extending parallel to the axes of the first and second gear wheels; third and fourth gear wheels mounted for rotation with the intermediate shaft; a pair of continuous interconnecting means, a first of which engages the first and third gear wheels and a second of which engages the second and fourth gear wheels; a pair of connecting arms extending between said wheel axes and said intermediate shaft; a first arm being pivotable about both the axis of the first gear wheel as well as the intermediate shaft, and a second arm being pivotable about both the intermediate shaft and the axis of the second gear wheel.

8. The lathe as defined in claims 7, in which the first and third gear wheels are of the same size and the second and fourth gear wheels are of the same size.

9. The lathe as defined in claim 7, in which the arms are adjustable with respect to their length.

10. The lathe as defined in claim 5, in which the first and third gear wheels are of the same size and the second and fourth gear wheels are of the same size.

11. The lathe as defined in claim 1 or 2, in which the main motor is stationary, and a gear unit connects the main motor to a turret spindle drive shaft concentric to the turret axis; said gear unit comprising a first gear wheel with a stationary axis, a second gear wheel, the axis of which is stationary in relation to the turret axis and parellel to the axis of the first gear wheel; a freely movable intermediate shaft parallel to the axes of the first and second gear wheels; said gear unit also comprising third and fourth gear wheels nonrotatably connected to the intermediate shaft and a pair of continuous connecting means, a first of which runs over the first and third gear wheels and a second of which runs over the second and fourth gear wheels; and a first arm pivotable about the axis of the first gear wheel and the intermediate shaft for interconnecting said axes and said intermediate shaft, and a second arm pivotable about the intermediate shaft and the axis of the second gear wheel for interconnecting said intermediate shaft and second gear wheel.

12. The lathe as defined in claim 11 in which the arms are adjustable with respect to their length.

13. The lathe as defined in claim 12, in which the first and third gear wheels are of the same size and the second and fourth gear wheels are of the same size.

14. The lathe as defined in claims 11, in which the first and third gear wheels are of the same size and the second and fourth gear wheels are of the same size.

* * * * *